A. BROCK, Jr., L. J. R. HOLST AND A. J. MOTTLAU.
METHOD OF AND APPARATUS FOR PHOTOGRAPHIC CARTOGRAPHY.
APPLICATION FILED DEC. 10, 1915.

1,331,978.

Patented Feb. 24, 1920.

A. BROCK, Jr., L. J. R. HOLST AND A. J. MOTTLAU.
METHOD OF AND APPARATUS FOR PHOTOGRAPHIC CARTOGRAPHY.
APPLICATION FILED DEC. 10, 1915.

1,331,978.

Patented Feb. 24, 1920.
8 SHEETS—SHEET 8.

Inventors
Arthur Brock Jr.
Lodewyk J. R. Holst
August J. Mottlau
By Francis T. Chambers
their Attorney

UNITED STATES PATENT OFFICE.

ARTHUR BROCK, JR., LODEWYK J. R. HOLST, AND AUGUST J. MOTTLAU, OF PHILADELPHIA, PENNSYLVANIA, ASSIGNORS TO SAID BROCK, JR.

METHOD OF AND APPARATUS FOR PHOTOGRAPHIC CARTOGRAPHY.

1,331,978.    Specification of Letters Patent.    Patented Feb. 24, 1920.

Application filed December 10, 1915. Serial No. 66,121.

*To all whom it may concern:*

Be it known that we, ARTHUR BROCK, Jr., LODEWYK J. R. HOLST, and AUGUST J. MOTTLAU, all citizens of the United States, and residents of the city and county of Philadelphia, State of Pennsylvania, have invented certain new and useful Improvements in Methods of and Apparatus for Photographic Cartography, of which the following is a true and exact description, reference being had to the accompanying drawings, which form a part thereof.

The primary object of our present invention is to provide a simple, reliable and effective method of, and apparatus for fixing the relative location of, the distances between, and in some cases the difference in elevation of, various points or objects on the earth's surface by means of a series of photographs taken at successive points along the path of travel of an aeroplane by a camera mounted on the latter.

In carrying out our invention we provide means for so supporting the camera on the aeroplane that the plane of the plate or other photographic surface of the camera upon which the photographic image is projected and recorded is maintained in a certain prescribed angular relation to the surface of the earth, while the successive pictures are taken this relation being fixed by the optical character of the camera.

In the practical carrying out of our invention we have connected the camera to the aeroplane by means permitting a universal adjustment of the camera with respect to the aeroplane, and having provided gyroscopic means for holding the camera with its external axis of projection vertical, or substantially so while the camera is in use. With the camera thus mounted, we take a series of pictures from points sufficiently close together along the path of travel of the aeroplane that the pictures overlap, and we utilize the points shown in the overlapping portions of successive pictures to fit the successively taken pictures together with the overlapping portions in register, determining the difference in scale between any two successively taken pictures by the apparent difference in the distances on the pictures between a pair of points shown in common on the two pictures, in case the variations in elevation of the aeroplane at the instants which the two pictures are taken makes this scale determination necessary or desirable. With the various pictures brought to the same known scale it becomes a simple matter to make a scale map of the territory shown by the pictures. The scale to which the pictures are brought may be determined either directly by instruments showing the elevation of the aeroplane at the time of taking any one picture in the series, or indirectly from the pictures themselves, if, as may well be the case, one of them shows two objects separated by a known distance. Differences in elevation of various points shown by the different pictures may be readily determined when this is necessary provided the scale of any one picture is known.

It will be obvious to those skilled in the art that many different kinds of camera mechanism may be employed in utilizing our invention in its broader aspects. In general, however, we prefer to employ a motor driven automatic camera having provisions for readily varying the time interval between successive exposures so that the proper overlap of successively taken pictures may be secured notwithstanding variations in aeroplane speed or elevation.

The various features of novelty which characterize our invention are pointed out with particularity in the claims forming a part of this specification, for a better understanding of the invention, however, and of the advantages possessed by it reference should be had to the accompanying drawings and descriptive matter in which we have illustrated by way of example preferred forms of apparatus devised by us and preferred modes of utilizing the same.

Of the drawings:

Fig. 3 is a sectional elevation of the camera shown in Figs. 1 and 2; Fig. 3ᴬ is an elevation of a portion of the plate holding frame.

Fig. 4 is a sectional elevation taken on a larger scale than Fig. 3, illustrating the plate numbering mechanism employed.

Fig. 5 is an elevation taken at right angles to Fig. 4,

In the preferred form of apparatus shown in Figs. 1 to 6 inclusive, A represents the frame work of an aeroplane which, in the form shown, is of the type in which there is a seat A' for a driver or observer, and a space beneath this seat in which the camera may be mounted. The camera C mounted in this space is provided with alined trunnions $B^2$ by which the camera is swiveled in a rectangular gimbal frame member B. The latter is connected by the pivot pins B' to the parts $A^2$ and $A^3$ of the frame work of the aeroplane. Advantageously the camera is made readily removable from the gimbal frame B as by making the bearings for the trunnions $B^2$ in the form of notches open at their upper ends. This permits the quick removal of the camera when the seat A' is lifted for the purpose. The axis of the alined pivot pins B' intersects the common axis of the trunnions $B^2$ at a point which coincides with or is practically coincident with the center of gravity of the rotating gyroscopic wheel D'. The latter rotates about a vertical axis and is driven at high speed, say ten thousand revolutions per minute, by the electric motor D mounted within the camera box or housing.

The camera C is a plate camera and when loaded contains a number of plates which are held in a plate holding frame or open ended receptacle H, divided by a horizontal shelf or partition H' into upper and lower compartments or cells each of which contains a stack of vertical plates E. The upper stack of plates is pressed forward against the guide ribs $H^4$ which engage the vertical edges of the front plate of the stack, by means of arms $H^5$ pivotally connected to the frame H at the upper rear corners thereof, these arms being engaged by springs $H^6$ secured to the rear wall of the camera housing. The lower stack of plates are engaged at the rear by the spring arms $H^3$ secured to the frame H and serving to hold the lower stack in the position in which the front plate of the stack bears against the narrow stationary guide ribs $H^2$ secured to the front vertical side edges of the lower compartment of the frame H. The upper ends of the guides $H^2$ terminate some distance below the partition H' and are outturned as shown clearly in Fig. 3. The plane of the rear edges of the ribs $H^2$ is back of the plane of the rear edges of the ribs $H^4$ a distance equal to the thickness of one plate E.

Figure 1:
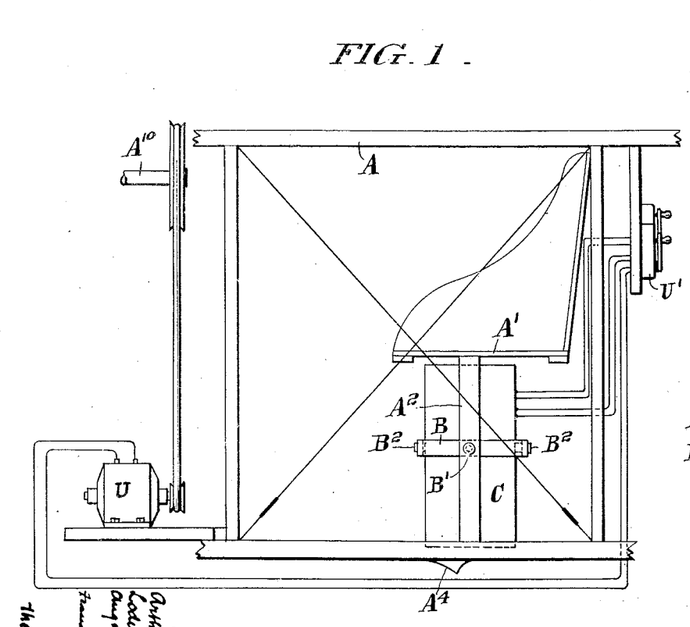
Figure 1 is an elevation of a portion of the frame work of an aeroplane with a camera mounted thereon in accordance with the present invention.
Figure 2:
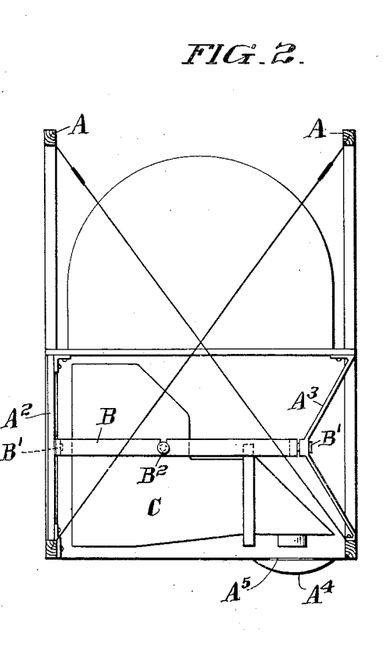
Fig. 2 is a sectional elevation taken transversely to Fig. 1.
Figures 3, 3A, 4, 5:
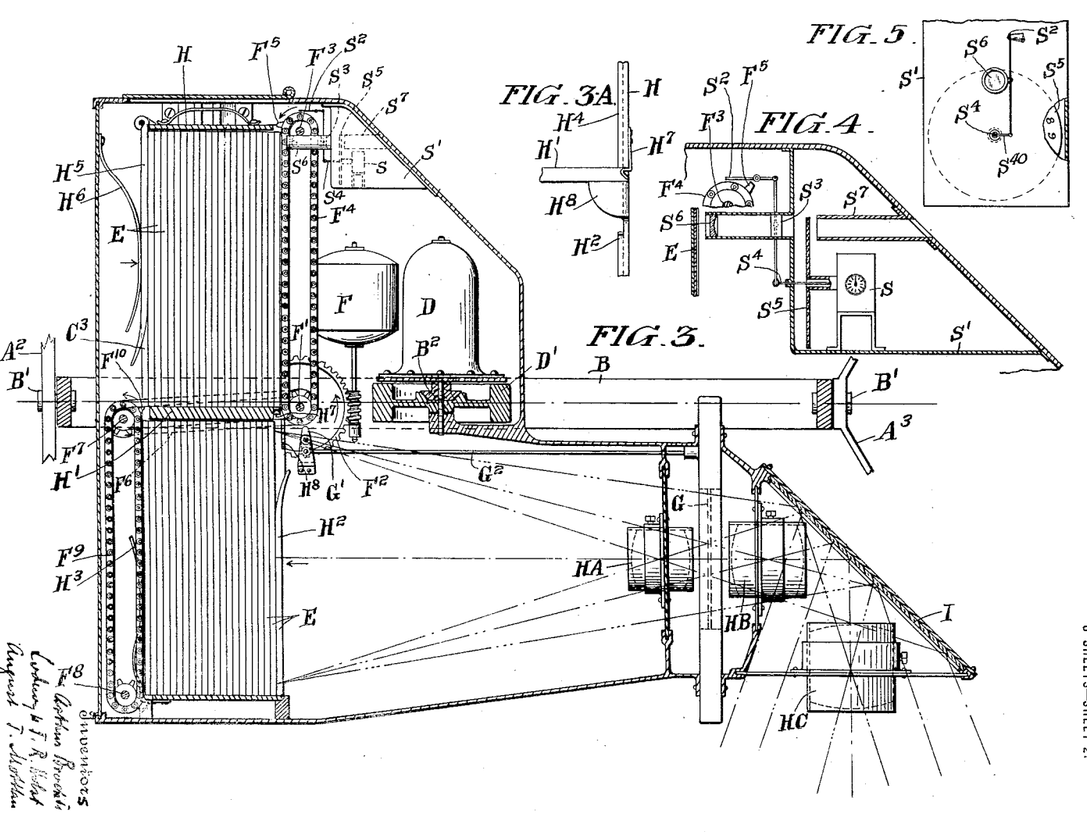

The camera C is provided with mechanism for successively transferring plates one at a time from the front of the upper stack to the front of the lower stack, and from the rear of the lower stack to the rear of the upper stack. This mechanism comprises a motor F mounted within the camera box and having its vertical shaft provided with a worm in mesh with a gear $F^2$ secured to the shaft F'. Sprocket wheels mounted on the shaft F' are coupled to similar sprocket wheels mounted on an upper shaft $F^3$ by sprocket chains $F^4$. These chains are provided each with a lug or finger $F^5$, and these lugs are adapted as they move downward from the position in which they are shown in Fig. 3, to simultaneously engage the upper edge of the then front plate in the upper stack and transfer the plate to the lower stack. As a plate E is thus transferred from the upper to the lower stack the lower edge of the plate engages the curved upper ends of the guide ribs $H^2$ and is thereby caused to displace the plate previously occupying the position of front plate in the lower stack. The springs $H^3$ yield to permit this displacement. Shortly after a plate is thus lowered and transferred from the front of the upper stack to the front of the lower stack, a plate E is transferred from the rear of the lower stack to the rear of the upper stack by means of the projections or fingers $F^{10}$ on sprocket chains $F^9$ running on sprocket wheels carried by shafts $F^7$ and $F^8$ at the rear of the lower stack of plates. The shaft $F^7$ is driven from the shaft F' through a sprocket chain $F^6$. Each plate as it is transferred from the rear of the lower stack to the upper stack operates in conjunction with the pivoted arms $H^5$ and springs $H^6$ to force the upper stack of plates forward until the front plate of the stack bears at its edges against guide ribs $H^4$. To prevent the front plate in the upper stack which is unsupported by the partition $H'$ from premature downward displacement, yielding spring detents $H^7$ may be secured to the sides of the holder H as indicated in Figs. 3 and $3^A$. The plate holder H is mounted in vertical guides in the camera box and may be removed from the latter through the opening in the upper wall of the camera box normally closed by the door $C'$. The parts are so relatively arranged that the removal of the plate holder H is not interfered with by the plate transfer mechanism provided the latter is adjusted into the position in which the fingers $F^5$ and $F^{10}$ are not in their plate engaging positions.

In normal operation each plate is exposed immediately after being moved into the position in which it is the front plate of the lower stack, the exposure being brought about by the momentary opening of a suitable shutter mechanism G. The latter, with the type of camera shown, may well be of the self-restoring type and is actuated by means of the lever $G'$ and rod $G^2$. The lever $G'$ is adapted to be engaged and oscillated by the finger $F^5$ of the corresponding chain $F^4$ during the short interval between the transfer of a plate from the upper stack to the front of the lower stack, and the engagement of the rear plate of the lower stack by the mechanism by which it is transferred to the upper stack.

Figure 6:
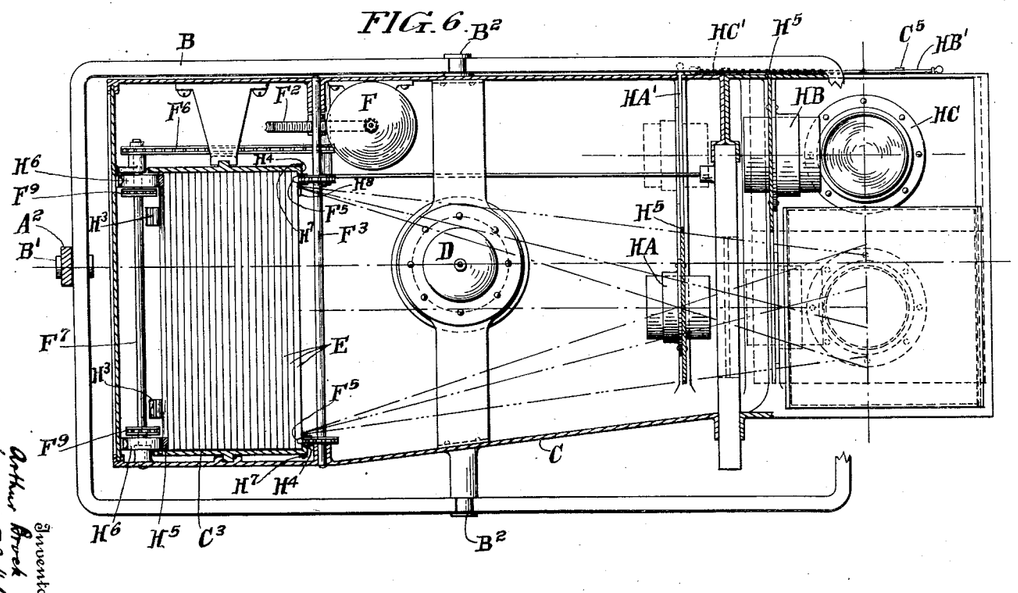
Fig. 6 is a plan partly in section of the camera shown in Figs. 1 and 2.

As shown, the camera comprises three lenses, HA, HB and HC, of successively greater focal lengths, which are mounted in horizontal guide ways so that each may be moved into and out of the operative position in which the axis of the lens coincides with the optical axis of the camera. As shown in Fig. 6, the lens HA is in the operative position and the lenses HB and HC are out of the operative position. The means shown for adjusting the lenses comprises operating rods or arms $HA'$, $HB'$ and $HC'$, each of which is pivotally connected at $H^5$ to the corresponding lens frame, so that when any of these rods is pulled out to move the corresponding lens from the operative to the inoperative position, the rod may be turned alongside the camera box as the arm $HB'$ is shown in Fig. 6. Each rod may be held against the camera box as by the spring clip $C^2$.

In the camera box shown in Figs. 1 to 6 the image received on the exposed plate is reflected by means of the plane reflecting surface I, inclined at an angle of 45° to the horizon. This has the effect of reversing the image, so to speak, and in addition is of advantage in facilitating the arrangement of the lenses of the camera. In the convenient arrangement shown the two lenses HA and HB have their axes horizontal and are located at opposite sides of the shutter between the reflecting surface I and the plate to be exposed, while the lens HC has its axis vertical and is located between the reflecting surface I and the ground. $A^4$ represents a cowl shielding the opening $A^5$ through which the rays of light enter the camera, the purpose of this cowl being to minimize the injurious optical effect of the air stream lines past the opening $A^5$ when the relative velocity of the aeroplane and the air in which it moves is high.

The current for operating motors D and F is furnished in the apparatus shown, by the generator U which is belt driven from the propeller motor shaft $A^{10}$ of the aeroplane. $U'$ represents a motor control box by which the speed of the motor F may be varied to thereby vary the time interval between successive plate exposures.

In order that the successively exposed plates when developed may show the relative order in which they were exposed, we provide means in the camera mechanisms shown for photographically recording an identifying number on each plate as it is advanced to or into the position in which it is exposed. In the camera shown in Figs. 1 to 6 inclusive, a number is photographed on one of the upper corners of each plate while it is at the front of the upper stack of plates. The mechanism for accomplishing this comprises a suitable case $S'$ located within the camera box and in which is mounted an automatic counter or register S. This mechanism comprises an operating lever $S^2$ adapted to be engaged and oscillated by the projection $F^5$ of the adjacent plate transfer chain $F^4$ just prior to the initial downward movement of the plate. The lever $S^2$ is link connected to a camera shutter $S^3$ and to an arm $S^{40}$ carried by the operating shaft $S^4$ of the register or counter S. By this arrangement the counter S is actuated, and the shutter $S^3$ opened and closed, once for each plate exposure just before the front plate in the upper stack is moved to the lower stack. On each actuation of the counter the transparent numbered dial $S^5$ forming a part of the counter is angularly advanced one number. The shutter $S^3$ is in line with a condensing lens $S^6$, and with a small tube $S^7$ open to the daylight at its outer end. In consequence when the shutter $S^3$ is opened light passing through the tube $S^7$, shutter and lens and also passing through a portion of the transparent disk $S^5$ which projects across the inner end of the tube $S^7$, photographs on the front plate of the upper stack the number carried by the portion of the disk $S^5$ in line with the tube S⁷. Advantageously the portion of the plate on which the number is thus printed is covered by the shield H⁸ when the plate is in position for exposure through the main operative lens of the camera. The shutter S³ is preferably of such type that it will be set by the initial movement of the lever S² which actuates the counter S and will open and close on the return movement of the lever S².

Figure 7:
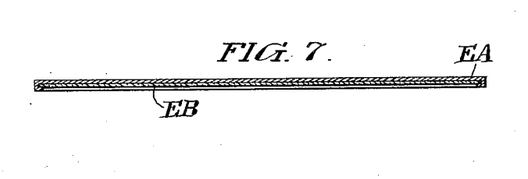
Fig. 7 is a sectional elevation of a plate and plate holder which may be employed.

We have referred to the plates E as if they were simple flat opaque plates coated on their front sides by the light sensitive material and this they may be. For practical purposes we prefer to employ flanged metallic plate holders EA as shown in Fig. 7 into which the thin plates EB proper are inserted. These plate holders may be of the same thickness at their flanged edges and of the same outline dimensions as the plates E shown in Figs. 3 and 5. With this construction the plate holder may have a slight flexibility which is desirable in that it facilitates the operation of the transfer mechanism, while on the other hand the plate holder has sufficient rigidity to prevent it or the flexible plate mounted therein from buckling or warping and desirably protects the plate from injurious contact with its coated face or with the plate transfer mechanism. For the purpose of rapid and accurate map making we prefer to employ plates in the form of ferrotypes, coated with a suitable light sensitive material. Such a plate may advantageously be coated with a high speed negative emulsion and may be developed after exposure and the developed picture stabilized by first treating the plate with a basic developer and then, as soon as the image is clearly brought out on the plate, treating the latter with an acid agent neutralizing the developer and preventing further development. The process just described is the sole invention of one of us, namely, Lodewyk J. R. Holst, and is fully explained and claimed in his application for patent Serial No. 52,088 filed September 22, 1915.

With a plate coated and treated in the manner just described an exposure of a hundredth of a second and a development and stabilizing treatment period of approximately a minute will give a sharp picture to which measuring instruments may be immediately applied for map construction purposes. The picture thus formed is stable enough to remain fairly clear after weeks of exposure to the light. Ferrotype plates possess the obvious advantages of light weight coupled with practical indestructibility and the pictures formed do not shrink or expand appreciably when wet or dried or as a result of heating them to hasten drying.

For some purposes where the high accuracy and speedy use of pictures obtainable with ferrotypes is not essential it is desirable to have the pictures taken on transparent films. This may be easily accomplished with the camera illustrated by mounting the film plates in the opaque holders EA. It will be understood, of course, that where the camera is intended to be wholly used for taking pictures on transparent film negatives the plate transfer mechanism shown may be replaced by film roll supporting and intermittently advancing mechanism.

In operation the camera after being loaded with unexposed plates is put in place in its gimbal mounting on the aeroplane and is then maintained in the position in which the optical axis of the camera or rather that portion of the broken axis which lies between the observed object and the reflector I is vertical, while the gyroscopic motor is brought up to speed. The camera may then be brought into operation by starting the motor F and running it at the proper speed to give the desired time interval between successive exposures. The proper one of the lenses HA, HB and HC is put into service to give the scale of picture which seems most desirable. It will be understood of course that the lenses are in universal focus, $i.\ e.$, each lens center is located at an optical distance from the exposed plate equal to the focal length of the lens.

The adjustment of the lenses and the transfer of the plates changes the center of gravity of the camera but slightly and the gyroscope holds the camera against movement out of the position in which the plates are maintained in optical parallelism, so to speak, with the horizon. Owing to the reversing effect of the reflecting surface I, the pictures when taken on ferrotypes show objects in the true right and left relation. The taking of pictures may be stopped and started at any time by starting and stopping the motor F. After the aeroplane flight is completed, the camera C may be bodily disconnected from the aeroplane and taken to a dark room where the plate holder H may be withdrawn and the exposed plates removed and developed. After the removal of the exposed plates the holder may be again fully charged with unexposed plates and put back into the camera which is then again in condition to be mounted on an aeroplane.

Figure 13:
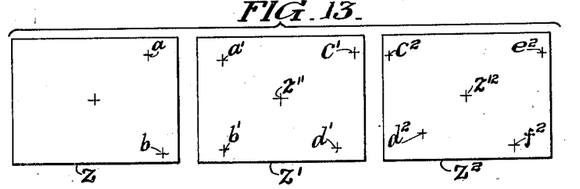
Fig. 13 is a view showing a plurality of successively taken pictures.

The three pictures $z$, $z'$ and $z^2$ shown in Fig. 13 are such as might be taken by the camera C at such different points along the travel of the aeroplane on which the camera is mounted, that the points marked $a$ and $b$ of the picture $z$, and the points $a'$ and $b'$ of the picture $z'$, are reproductions of one pair; and the points $c'$ and $d'$ of picture $z'$ and the point $c^2$ and $d^2$ of the picture $z^2$, are reproductions of another pair of separated points or objects on the surface of the earth. The points or objects thus reproduced and marked may be church spires, wind mills, chimneys, corners of buildings, trees, hay stacks, corners of plowed fields, intersections of roads or paths, or like projections or marks on the ground shown by the pictures. Assuming that pictures are taken with a camera lens of twelve inch focus on plates seven inches square and with a camera elevation of 3000 feet then five pictures to each mile traveled by the aeroplane will ordinarily give ample overlap. When the pictures $z$, $z'$ and $z^2$ are all taken at the same elevation or approximately the same elevation and the observed points are at approximately the same level, a map of the portion of the earth's surface shown by the different pictures may be formed by arranging the pictures so that the points $a$ and $a'$, $b$ and $b'$, $c$ and $c'$, and $d$ and $d'$ will coincide respectively. The feasibility of thus matching together the successively taken pictures by means of the points shown in common on the different pairs of pictures does not depend in any way upon whether the aeroplane traveled in a straight line or not, or upon whether the angular relation between the axis of the aeroplane and its line of flight remained constant, or varied, as it ordinarily does in practice.

If the aeroplane was at substantially different elevations at the instants at which the different pictures were taken, this necessitates, for accurate distance work, that the different pictures be brought to a common scale. This may be easily and accurately accomplished by various geometrical methods from measurements taken from the different pictures.

Figures 14, 16:
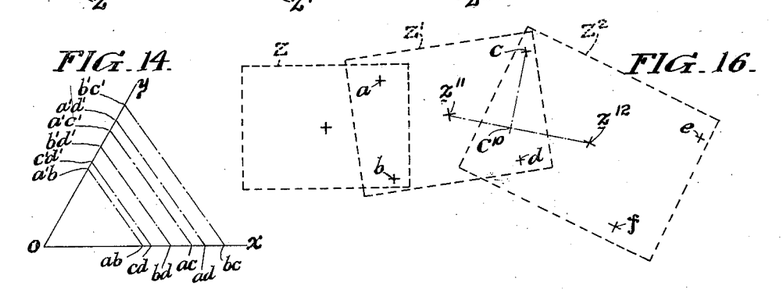
Figs. 14 and 15 are construction figures employed in bringing the pictures shown in Fig. 13 to the same scale.
Fig. 16 represents a scale map constructed from the pictures shown in Fig. 13, and Figs. 17 and 18 are construction drawings of the kind employed to determine the elevation of points shown by the pictures illustrated in Fig. 13.
Figure 15:
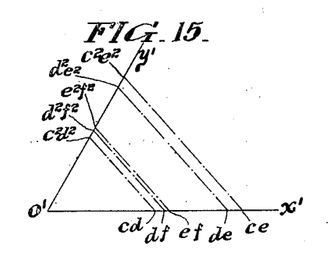

Figs. 14 and 15 show construction drawings which may be used in a preferred method of bringing the various pictures to the same scale, and Fig. 16 illustrates the formation of a scale map from the pictures shown in Fig. 13 and the construction drawings of Figs. 14 and 15. In the formation of the map shown in Fig. 16, the pictures $z'$ and $z^2$ were first brought to the scale of the picture shown in $z$, so that the scale of the picture $z$ gives the scale of the map in Fig. 16. The scale of the picture $z$ is fixed by the focal length of the camera lens and the height of the aeroplane at the time at which this picture was taken. This height may be directly determined in some cases as by a barometrical gage, and can be determined in all cases from the distance between any pair of points, as the points $a$ and $b$ of the picture $z$ in case the actual distance between the points or objects of which the points $a$ and $b$ are images is known. To bring the picture $z'$ to the scale of the picture $z$, by the particular geometrical method illustrated, the point $ab$ is marked on the line $ox$, at a distance from the point $o$ equal to the distance between the points $a$ and $b$ on the picture $z$. Then on a line $oy$ intersecting the line $ox$ at any convenient angle, the point $a'b'$ is drawn at a distance from the intersecting point $o$, equal to the distance between the points $a'$ and $b'$ in picture $z'$. The point $b'd'$ is then marked on the line $oy'$ at a distance from the point $o$, equal to the distance between the points $b'$ and $d'$ of the picture $z'$. Then on drawing the line $b'd'$—$bd$, as shown, parallel to the line $a'b'$—$ab$, the distance between the points $o$ and $bd$ will be the distance between the points $b'$ and $d'$ of the picture $z'$ when the picture $z'$ is enlarged to the scale of the picture $z$. Similarly when the picture $z'$ is brought to the scale of picture $z$ the corrected distance between the points $a'$ and $d'$ of Fig. 1, is represented by the distance $o$—$ad$ and the corrected distances between the points $b'$ and $c'$ and between the points $c'$ and $d'$ are represented by the distances $o$—$bc$ and $o$—$cd$ respectively.

To bring the picture $z^2$ to the scale of the picture $z$, the distance $o'cd$, equal to the distance $o$—$cd$ on Fig. 11, is drawn along the line $o'x'$ of Fig. 15 and the distance $o'$—$c^2d^2$ is marked on the line $o'y'$ intersecting the line $o'x'$ at any convenient angle. The actual scale ratio of the two pictures $z$ and $z^2$ will then be proportional to the length $o'$—$cd$ and $o'$—$c^2d^2$, and the distances between the various points $c^2$, $d^2$, $e^2$ and $f^2$ of picture $z^2$ when the latter is brought to the scale of picture $z$ are found in the manner already explained in connection with Fig. 14.

In forming the map of Fig. 16, the points $a$ and $b$ are first put down at their actual distance apart on picture $z$. The point $c$ is then found by the intersection of arcs drawn about the points $a$ and $b$ as centers, with radii equal in length to the distances $o$—$ac$ and $o$—$bc$ of Fig. 14 respectively. The point $d$ is found in a similar manner. The points $c$ and $d$ thus located are employed as centers for locating the points $e$ and $f$ with radii corresponding to distances marked on the line $o'x'$ of Fig. 15 in a manner identical with that already described for locating the points $c$ and $d$.

The map shown in Fig. 16 may be made with a high degree of accuracy by the simple method already described, provided the points on the pictures from which the measurements taken are images of objects or marks on the earth's surface at substantially the same horizontal level. In case there is a substantial difference in elevation between the different points observed it is usually necessary that these differences in elevation should be determined, and extreme accuracy in map making requires that the effect thereof should be compensated for in making a scale map from the pictures. It is an advantageous characteristic of our invention, however, that the elevation of the different points shown by the pictures may be determined with a high degree of accuracy by means of measurements taken from the pictures themselves. For example, assuming that it may be desired to determine the elevation of the object or mark on the earth's surface indicated in pictures $z'$ and $z^2$ by the points $c'$ and $c^2$ respectively, i. e., the point $c$ of the map shown in Fig. 16, this may be readily accomplished with the map of Fig. 16 and the drawings shown in Figs. 17 and 18. For this purpose we have marked in Fig. 16 the points $z^{11}$ and $z^{12}$ on the plane of the map of the points at which the camera was located at the instants at which the pictures $z'$ and $z^2$ respectively were taken. These points will be the points of the pictures intersected by the optical axis of the camera. For instance with the camera C the points $z^{11}$ and $z^{12}$ will be at the geometrical centers of the plates on which the pictures to which they pertain were taken. In Fig. 16 $c^{10}$ represents the projection of the point $c$ on the line $z^{11}$—$z^{12}$. In Fig. 18 the vertical distance $w$ represents the focal length of the camera on the scale of the outline of the picture $z$ to the outline of the actual plate on which the picture is taken, and $z^{11}$—$c^{10}$ and $z^{12}$—$c^{10}$ represent distances taken from Fig. 16.

Figure 17:
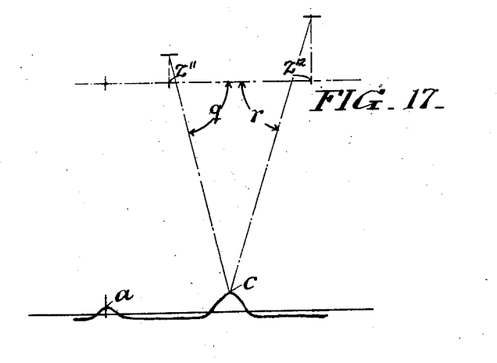
Figure 18:
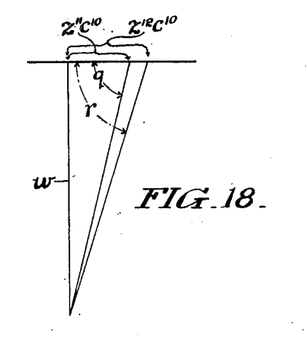

In Fig. 17 the line $z^{11}$—$z^{12}$ equals the distance between the points $z^{11}$ and $z^{12}$ on Fig. 16, and the lines at $c$ make the same angles with the line $z^{11}$—$z^{12}$ as the angles $q$ and $r$ obtained from Fig. 18. It will be understood that these lines intersecting at $c$ represent the projections on the plane of Fig. 17 of the rays extending from the point $c$ to the camera positions at which the pictures $z'$ and $z^2$ were taken. Fig. 17 is on the scale of Fig. 16 and the difference in elevation between the point $c$ and the known or determinable elevation at which the picture $z$ was taken is proportional to the distance in Fig. 17 from $c$ to the line $z^{11}$—$z^{12}$.

Theoretically differences in elevation between different observed points would necessitate for extreme accuracy that the map of Fig. 16 should be corrected after an approximate elevation determination in the manner just described after which the corrected map of Fig. 16 might be used in determining with greater accuracy the elevation of the different points. In practice the map of Fig. 16 may be made accurately enough for most military purposes by the method first described even though the observed points differ very considerably in elevation, provided each pair of points used in horizontal scale determination lie on a line approximately transverse to the general line of travel of the aeroplane.

In Figs. 8 to 12 inclusive we have illustrated a duplex camera constructed and adapted for use in accordance with the present invention and of especial utility under certain conditions. The duplex camera in the form shown comprises a camera CA having a relatively short focus or wide angle lens, and a camera CB with a relatively long focus or telephoto lens. The two camera boxes are rigidly connected to each other and are mounted in a gimbal frame B as is the single camera box of the construction already described. Between the two cameras proper is mounted the motor DA for rotating the gyroscopic wheel DA'. The camera operating motor FA as shown is mounted beneath the motor DA and has its vertical shaft provided with a worm in mesh with a gear wheel $F^{21}$ secured to the shaft $F^{22}$. The latter is the main operating shaft of the wide angle camera CA. The main operating shaft $FA^{22}$ for the telephoto camera is in alinement with the shaft $F^{22}$ and is adapted to be detachably connected thereto by a suitable clutch mechanism of which $F^{40}$ represents the operating handle. The two camera mechanisms may be, and are shown as being substantially identical except for certain obvious differences in dimension and for certain features to which reference is hereinafter made.

Figure 8:
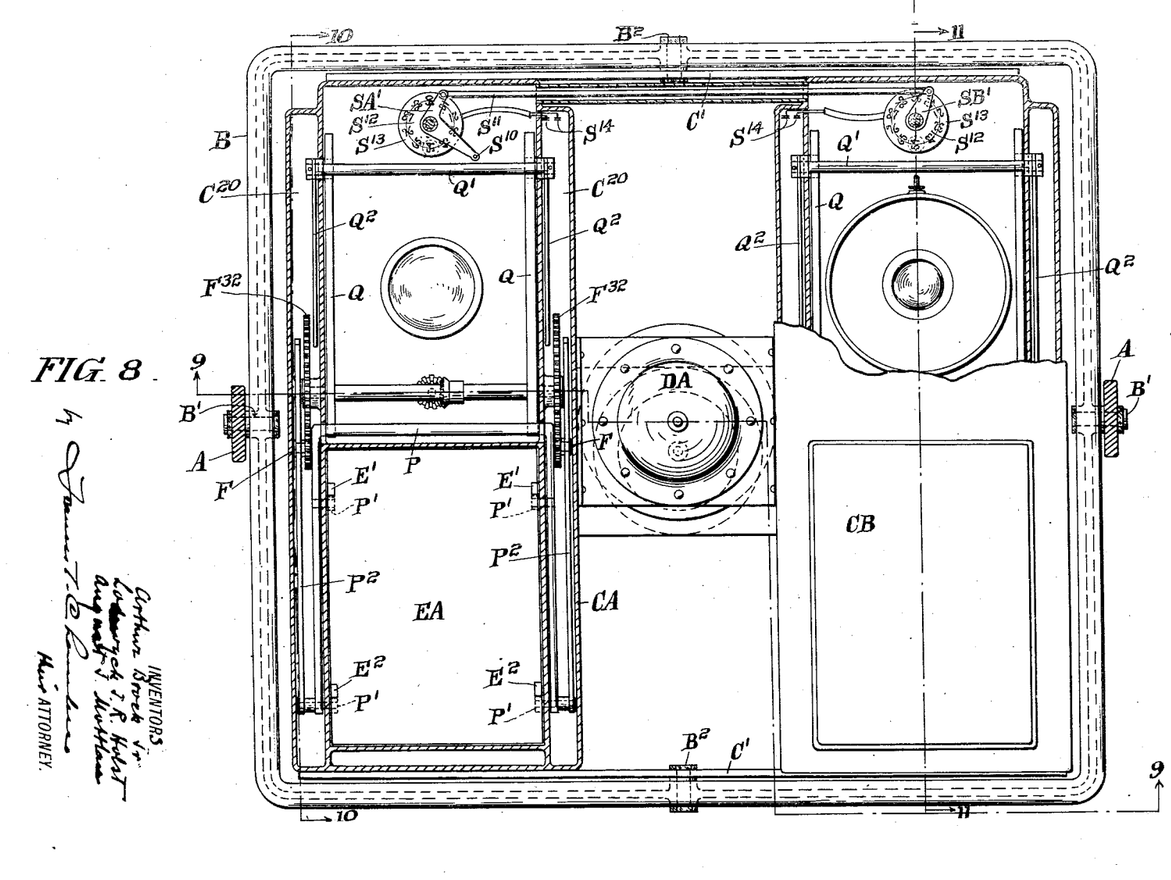
Fig. 8 is a plan view partly in section on the line 8—8 of Fig. 9 showing a modified form of camera mechanism which may be employed.
Figure 9:
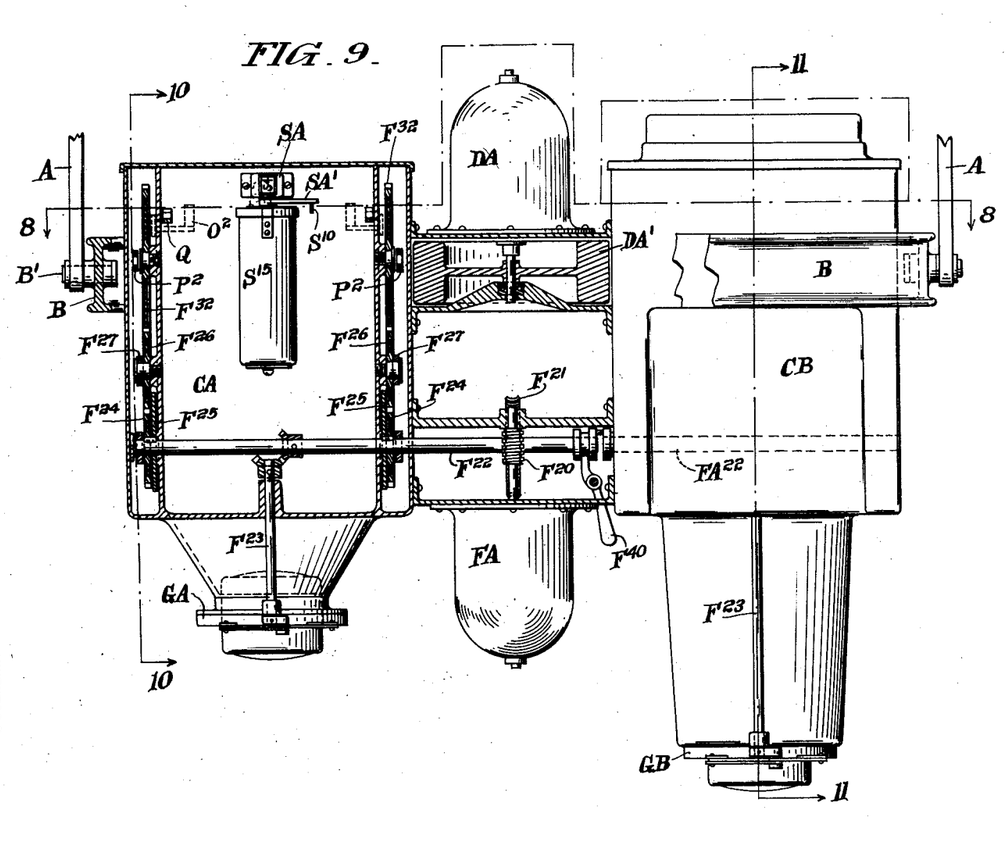
Fig. 9 is an elevation partly in section on the line 9—9 of Fig. 8.
Figure 10:
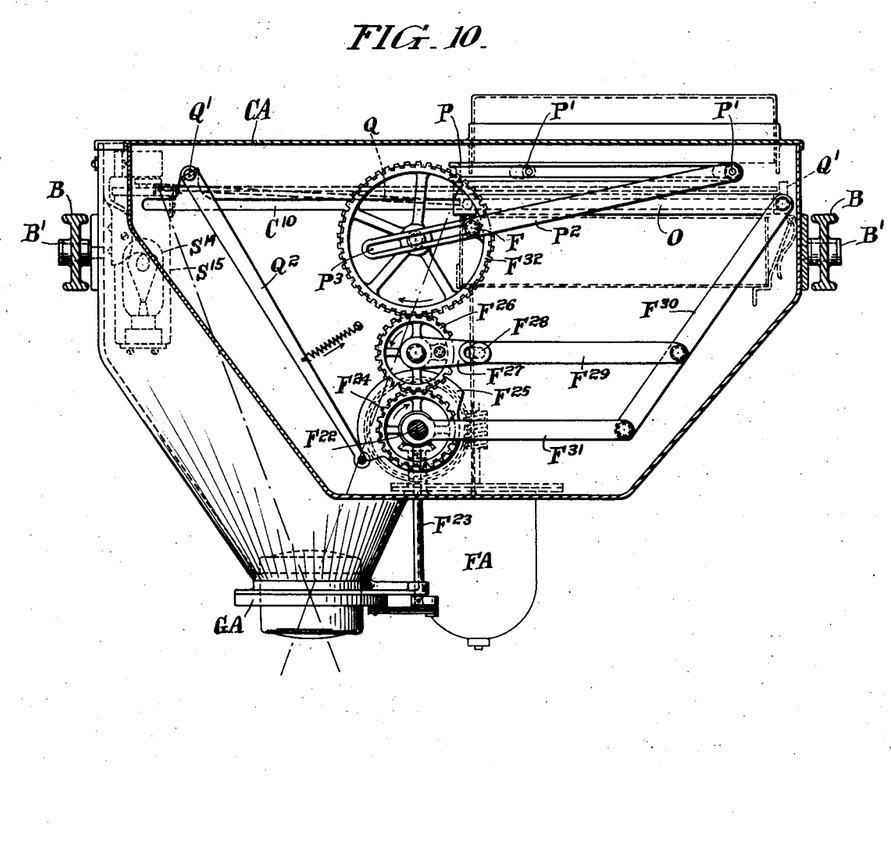
Fig. 10 is a section on the line 10—10 of Fig. 9.
Figures 11, 12:
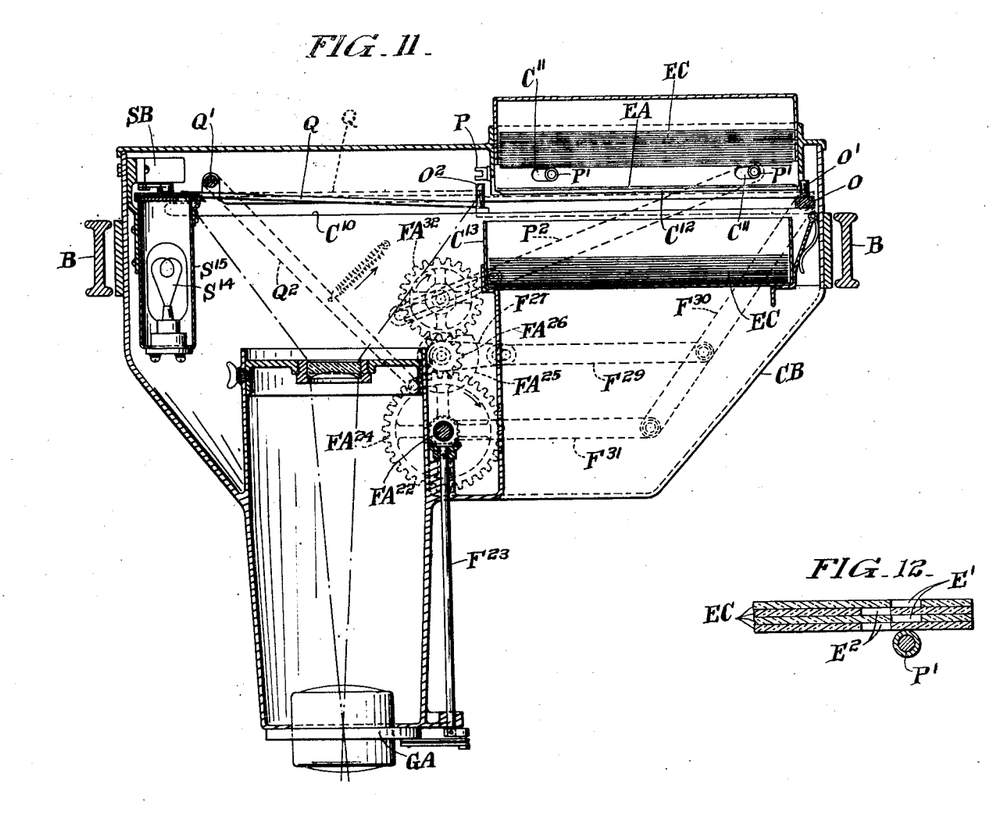
Fig. 11 is a section on the line 11—11 of Fig. 9.
Fig. 12 is a sectional elevation taken similarly to Fig. 11, but on a much larger scale and illustrating a detail of construction employed in Fig. 11.

Geared to the main operating shaft of each camera is a transverse shaft $F^{23}$. The shafts $F^{23}$ operate the shutters GA and GB of the cameras CA and CB respectively. Secured to the operating shaft $F^{22}$ in each of the two gear chambers $C^{20}$ of the camera CA is a gear $F^{24}$ and a cam $F^{25}$. In mesh with each gear $F^{24}$ is a gear $F^{26}$ and in mesh with the latter is a gear $F^{32}$. The gear $F^{32}$ has twice the number of teeth, and hence revolves half as rapidly as the gear $F^{26}$. The main shaft $FA^{22}$ of the camera CB rotates gears $FA^{24}$, $FA^{26}$ and $FA^{32}$ corresponding to the gears $F^{24}$, $F^{26}$ and $F^{32}$ respectively, except that the tooth ratio of the gears $FA^{24}$ and $FA^{26}$ is three times the tooth ratio of the gears $F^{24}$ and $F^{26}$, so that the gears $FA^{26}$ and $FA^{32}$ rotate three times as fast as do the gears $F^{26}$ and $F^{32}$. The gears just referred to form a part of the plate shifting mechanism of the cameras. The plate shifting mechanism of the two cameras are identical except in the number of teeth and speed of the gears to which reference has just been made. Each plate shifting mechanism comprises a pair of levers $F^{30}$ each pivoted at its lower end to a swinging distance piece $F^{31}$, and connected between its ends by the link $F^{29}$ to an arm $F^{27}$ secured to the corresponding gear $F^{26}$ or $FA^{26}$ as the case may be. The two levers $F^{30}$ of each camera are connected at their upper end to a yoke shaped frame O the legs of which lie along the opposite sides of the plate magazine or respectacle $C^{14}$. The crossbar portion of the frame O works in slots $C^{10}$ and has plate engaging projections O' on its upper side. The member O is provided at the ends of its legs with bent arms which project through the slots $C^{21}$ and terminate in plate engaging projections $O^2$. In operation the projections O' of the plate shifter O engage the rear edge of a plate EC resting on the guide ribs $C^{12}$ and move it into the position in which it rests on the guides Q when the latter are in the position shown in full lines in Figs. 10 and 11. In this position the plate is exposed, after which the plate is moved back by the engagement of the plate by the arms $O^2$. As the plate is thus moved to the right as shown in Figs. 10 and 11, the guides Q are tilted so that the plate will not be moved back on to the guides $C^{12}$ but may drop into the receptacle $C^{13}$ for exposed plates. To permit this shifting of the guides Q the latter are secured to the rock shaft Q' to which are also secured arms $Q^2$ which are spring held against the edges of cams $F^{25}$ or $FA^{25}$. In order that the plate may be held stationary during the period of exposure without interrupting the constant rotation of the gear wheels, the arms $F^{27}$ are connected to the links $F^{29}$ by pin and slot connections permitting a certain amount of lost motion. To facilitate the dropping of the plates EC one at a time on the guides $C^{12}$, the plates EC are formed as shown in Fig. 8, with notches E' and $E^2$. The notches E' are closer the adjacent end edge of the plate than are the notches $E^2$ and when the plates are assembled in the unexposed plate receptacle $C^{14}$ they are alternately turned end to end so that the notches E' and $E^2$ of the superimposed plates appear as shown in Fig. 12. The assembled stack of unexposed plates rest on pins P' projecting inwardly from the yoke shaped member P which surrounds the unexposed plate receptacle on three sides. The pins P' project through slots $C^{15}$ in the wall of the receptacle $C^{14}$, and are movable from one position in which they lie under the notches E' and $E^2$ of the alternate plates in the stack into the position in which they lie under the notches of the intermediate plates. As the pins P' are shifted from one position to the other the then bottom plate of the stack drops to the guide ribs $C^{12}$. The pins P' are shifted in only one direction or the other for each complete oscillation of the plate shifter O by means of the links $P^2$ connected at their upper ends to the corresponding members P and connected at their lower ends by pin and slot connections to the half-time gears $F^{32}$ or $FA^{32}$. The pin and slot connection provided is such that the shift in one direction or the other of the member P will occur during a slight angular movement of the corresponding gears $F^{32}$ or $FA^{32}$.

The plate numbering mechanism SA of the camera CA comprises an operating lever SA' having a pin $S^{10}$ engaged by the plate to thereby actuate the counter as the plate is moved by the transfer device O into the position for exposure. On such actuation of the lever SA' the counter SA is correspondingly operated and the one or both of the units and tens dials $S^{12}$ and $S^{13}$ correspondingly advanced. Each plate when in the position for exposure projects over the dials $S^{12}$ and $S^{13}$ so that when the electric lamp $S^{14}$ in the lamp case $S^{15}$ beneath the dials is lighted, the corresponding number will be photographed on the plate. The illumination of the lamp is controlled by the closure and opening of electrical contacts $S^{16}$ engaged by the member O when the latter is in the position occupied by it during the exposure of the plate.

The number printing mechanism of the camera CB is substantially identical with that of the camera CA except that the operating arm SB' is not operated by the plates exposed in the camera but is operated by the arm SA' through the connecting rod $S^{11}$. With this arrangement three plates successively exposed in the camera CB will bear the same number which will correspond to the number borne by a plate exposed during the same period in the camera CA.

In operation the camera CA may be used alone to take overlapping pictures from which maps may be made as with the camera first described, and the camera CA should be of a convenient size and focal length for this purpose. In some cases it may be very desirable to have larger scale photographs of a certain restricted portion of the field photographed by the camera. For instance in military reconnaissance, large scale photographs of clumps of trees or patches of brush which may conceal troops in ambush or artillery may be very desirable. Such large scale pictures may be readily taken with the camera CB which may be thrown into and out of operation as required. On account of the restricted field of vision covered by the camera CB the latter is arranged to take pictures much more rapidly than the camera CA when both are in operation, the ratio in the machine shown being three to one. On account of the restricted field of the telephoto camera we consider it distinctly desirable to have corresponding identifying symbols marked on the plates exposed at the same time in the different cameras so that the territory covered by the large scale pictures may be quickly located on the map which may be made from the pictures taken by the wide angle lens. The plate shifting mechanism employed in the cameras CA and CB does not materially shift or disturb the center of gravity of the gyroscopically controlled camera structure as a whole, though in this respect the plate shifting mechanism of these cameras is perhaps less satisfactory than the plate shifting mechanism of the camera C.

By the term "external optical axis" used in the claims we mean the axis of projection external of the camera which is indicated in the drawings by the line X.

While in accordance with the provisions of the statutes we have illustrated the best embodiments and modes of carrying out our invention now known to us, those skilled in the art will understand that many modifications may be made in the form of the apparatus and the modes of operation disclosed without departing from the spirit of our invention and that certain features of our invention may sometimes be used with advantage without a corresponding use of other features.

While we consider our invention of particular utility for use in connection with what is known as an aeroplane in distinction from other air craft, it will be understood of course that the invention can be used in connection with dirigible balloons, moving captive balloons or other air craft which travel through the air, and by the use of the term "aeroplane" in the claims we do not intend to exclude other forms of air craft.

Having now described our invention, what we claim as new and desire to secure by Letters Patents is,

1. The method of cartography which consists of successively taking overlapping pictures in a camera carried on an aeroplane in flight while maintaining the camera with its externally optical axis in parallelism with itself, the point of intersection of said optical axis with the picture being determined and plotting a map from said pictures, by utilizing points shown in common on successively taken pictures in conjunction with the said points of intersection of the optical axis, to locate points shown in one picture in their correct relative position to points shown on the other picture.

2. The method of cartography which consists of successively taking overlapping pictures in a camera carried on an aeroplane while in flight while maintaining the camera with its external optical axis in parallelism with itself, the point of intersection of said optical axis with the picture being determined by the camera design, and plotting a map from said pictures by utilizing said point of intersection of the optical axis with the picture in conjunction with points shown in common on a pair of successive pictures to thereby locate points shown only on one picture in their true position relative to points shown only on another picture.

3. The method of cartography which consists of successively taking overlapping pictures in a camera carried on an aeroplane in flight while maintaining the camera with its external optical axis in parallelism with itself, the point of intersection of said optical axis with the picture being determined by the geometrical center of such pictures, and plotting a map from such pictures by utilizing said geometrical center of each picture in conjunction with points shown in common by two or more pictures to thereby locate points shown on only one of the pictures in their true position relative to points shown only on another picture.

4. In combination with an aeroplane, a camera mounted on said aeroplane with freedom for adjustment and comprising a motor and mechanism actuated thereby for taking successive pictures at determined time intervals and gyroscopic camera adjusting means for maintaining the camera with its external optical axis in parallelism with itself as the aeroplane travels through the air.

5. In combination with an aeroplane, a camera mounted on said aeroplane with freedom for adjustment and comprising a variable speed motor and mechanism actuated thereby for taking successive pictures at regular time intervals, means for adjusting the speed of the motor to vary said intervals and gyroscopic camera adjusting means for maintaining the camera with its external optical axis in parallelism with itself as the areoplane travels through the air.

6. In combination with an aeroplane, a camera mounted on said aeroplane with freedom for adjustment and comprising a plurality of interchangeably usable lenses of different focal lengths and gyroscopic camera adjusting means for maintaining the camera with its external optical axis in parallelism with itself as the areoplane travels through the air.

7. In combination with an aeroplane, a duplex camera mounted on said aeroplane with freedom for adjustment and comprising two mechanically actuated cameras with lenses of different focal lengths and gyroscopic camera adjusting means for maintaining the camera with its external optical axis in parallelism with itself as the aeroplane travels through the air.

8. In combination with an aeroplane, a duplex camera mounted on said aeroplane with freedom for adjustment and comprising two mechanically actuated cameras having lenses of different focal lengths and provisions for simultaneously applying identifying marks to the pictures taken in the two cameras and gyroscopic camera adjusting means for maintaining the camera with its external optical axis in parallelism with itself as the aeroplane travels through the air.

9. In combination with an aeroplane a camera mounted on said aeroplane with freedom for adjustment, a gyroscope and an electric motor for driving the same mounted on said camera, a second electric motor mounted on said camera and mechanism actuated thereby for taking successive pictures at determined time intervals, and an electric generator driven from the propelling mechanim of the aeroplane and supplying current for operating said motors.

10. In combination with an aeroplane, a magazine camera mounted on said aeroplane with freedom for adjustment and comprising provisions for successively shifting sensitive image receiving surfaces into position for exposure and means for photographically marking each surface as it is advanced with an identifying symbol and gyroscopic camera adjusting means for maintaining the camera with its external optical axis in parallelism with itself as the aeroplane travels through the air.

11. In combination with an aeroplane, a magazine camera mounted on said aeroplane with freedom for adjustment and comprising means for holding a plurality of plates and for successively moving said plates into and out of the position for exposure without appreciably shifting the center of gravity of the camera, and gyroscopic camera adjusting means for maintaining the camera with its external optical axis in parallelism with itself as the aeroplane travels through the air.

12. In combination with an aeroplane of a magazine camera mounted on said aeroplane with freedom for adjustment and comprising two stacks of plates and means for shifting one plate from each stack to the other for each plate exposure, and gyroscopic camera adjusting means for maintaining the camera with its external optical axis in parallelism with itself as the aeroplane travels through the air.

13. In combination with an aeroplane, a camera mechanism mounted on said aeroplane with freedom for adjustment and comprising a self contained motor and mechanism actuated thereby for taking successive pictures at determined time intervals.

ARTHUR BROCK, Jr.
LODEWYK J. R. HOLST.
AUGUST J. MOTTLAU.